United States Patent [19]

Alavi

[11] Patent Number: 5,970,467

[45] Date of Patent: Oct. 19, 1999

[54] ACCURATE MARKET SURVEY COLLECTION METHOD

[75] Inventor: Kamal Alavi, Montgomery, Tex.

[73] Assignee: Enviro EC AG, Zug, Switzerland

[21] Appl. No.: 08/903,956

[22] Filed: Jul. 31, 1997

[51] Int. Cl.⁶ .................................................. H04J 11/00
[52] U.S. Cl. ................... 705/10; 705/10; 348/13
[58] Field of Search ................. 340/825.54; 348/552, 348/1, 2, 13, 12; 379/92.01; 705/10, 7, 14

[56] References Cited

U.S. PATENT DOCUMENTS

| | | | |
|---|---|---|---|
| 4,658,290 | 4/1987 | McKenna et al. | 358/84 |
| 4,745,468 | 5/1988 | Von Kohorn | 358/84 |
| 5,339,239 | 8/1994 | Manabe et al. | 705/1 |
| 5,774,869 | 6/1998 | Toader | 705/10 |

*Primary Examiner*—Emanuel Todd Voeltz
*Assistant Examiner*—Thomas A. Dixon
*Attorney, Agent, or Firm*—Mary J. Gaskin

[57] ABSTRACT

A method for electronically accumulating market survey data from inherently interested Internet users or TV viewers. Various market survey questions can be disseminated to Internet users and TV viewers, and the answers are processed at a central location. In exchange for his answers, the responder receives free access to the Internet or cable TV for a predetermined amount of time.

2 Claims, 4 Drawing Sheets

ACCURATE MARKET SURVEY COLLECTION METHOD

FIELD OF INVENTION

The present invention relates to a method for rapidly electronically collecting market survey data from different locations from inherently interested responders.

BACKGROUND OF INVENTION

Various systems and methods have been used to collect market surveying data. Methods include written questionnaires and telephone solicitations. Such systems can be time consuming and inaccurate. Many potential responders will not fill out a questionnaire or answer questions from a caller. Further, collection of information can not be analyzed quickly. There is a need for a market survey data collection method which is both fast and inherently accurate.

SUMMARY OF THE INVENTION

The present invention incorporates the use of a computer to disseminate questions which can be answered by a responder, who keys in answers by use of a keyboard or a mouse. The responder is a willing participant in the survey due to the fact that his participation in the survey is rewarded by free Internet access or free cable television viewing time.

In accordance with the present invention, different surveys may be rapidly downstream loaded to different Internet users and cable TV viewers. The surveys may be modified quickly, depending on the previous response of responders. In addition, surveys may be tailored to individual responders based on demographic input by the responder.

DESCRIPTION OF PREFERRED EMBODIMENT

Figure 1:
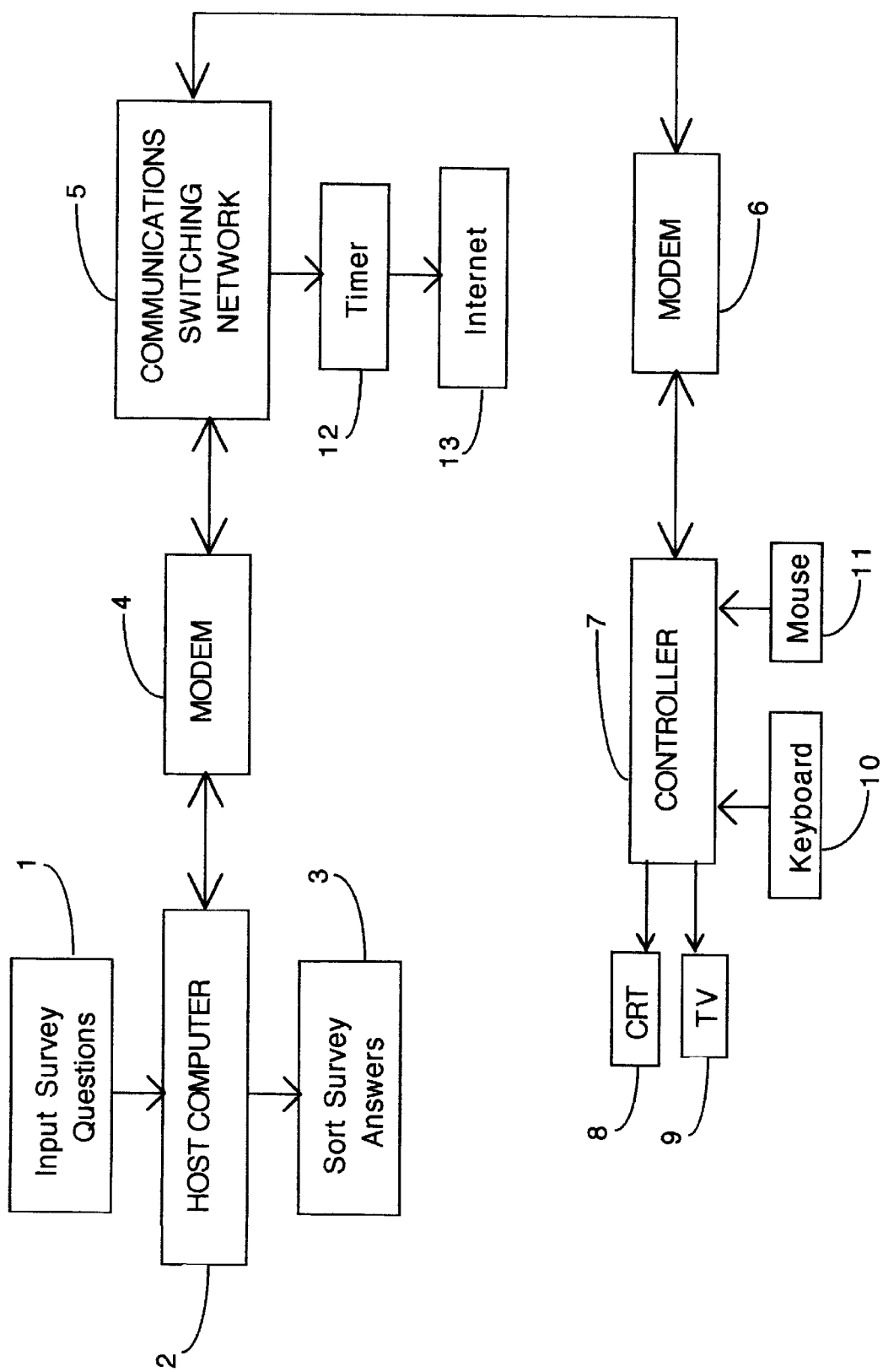
FIG. 1 is a block diagram of the accurate market survey collection method of the present invention when Internet access is sought by the responder.

As shown in FIG. 1, the invention provides for the input of survey questions 1 into the host computer 2, which is programmed to mainstream load market survey questionnaire control programs with sets of control instructions and to receive and process survey data which is transmitted back to the host computer 2 from the responder's controller 7. The host computer 2 outputs sorted survey answers to the questions 3 in a format useable by the market survey requester. Modem 4 links the host computer 2 to each controller 7 via a communications switching network 5, such as a telephone, and modem 6 at the controller 7.

A responder will use a visual display means such as a CRT (cathode ray tube) 8 or TV (television) 9 for viewing the questions in the marketing survey. The CRT 8 or TV 9 is linked to the controller 7, which includes a microcomputer or microprocessor. The responder answers the questions by using the keyboard 10 or the mouse 11. After the host computer 2 receives the answers to the complete survey, the timer 12 will be activated and the controller 7 will be connected the Internet 13 for a predetermined number of minutes, at no cost to the responder.

Figure 2:
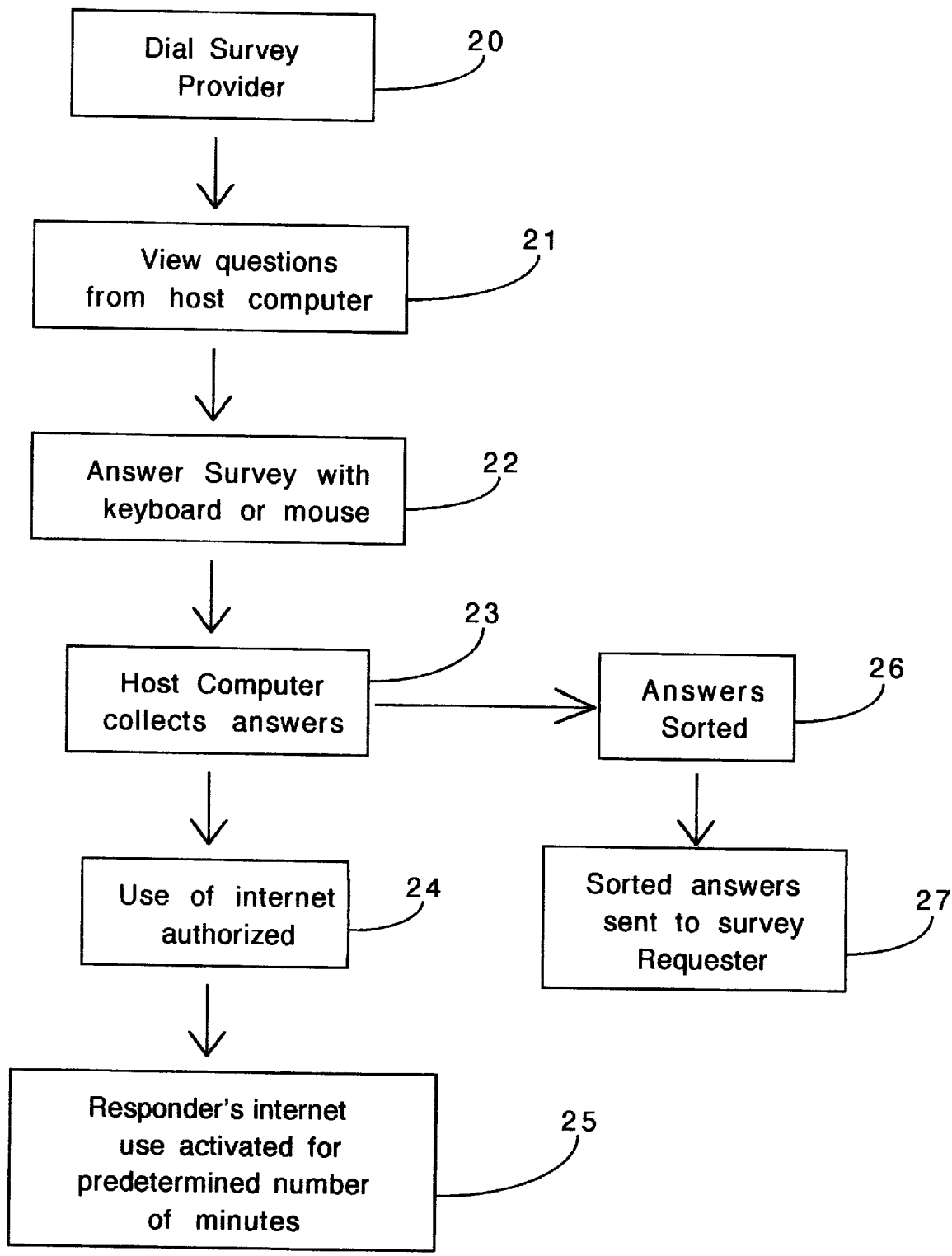
FIG. 2 is a flow diagram of the steps taken to practice the present invention when Internet access is sought by the responder.

FIG. 2. shows the steps a responder seeking Internet access will use to take advantage of the present invention. The responder will dial the survey provider 20 at an Internet gateway (server) such as Sun Sparc 3000, using a telephone. He will be connected to the Internet gateway (server) such as Sun Sparc 3000. He will view questions from the host computer 21. He will answer the survey using a keyboard or mouse 22. The host computer will collect the answers 23, sort the answers 26, and return the sorted answers to the survey requester. The host computer will authorize the responders use of the Internet 24, and responder will have Internet access for a predetermined number of minutes.

Figure 3:
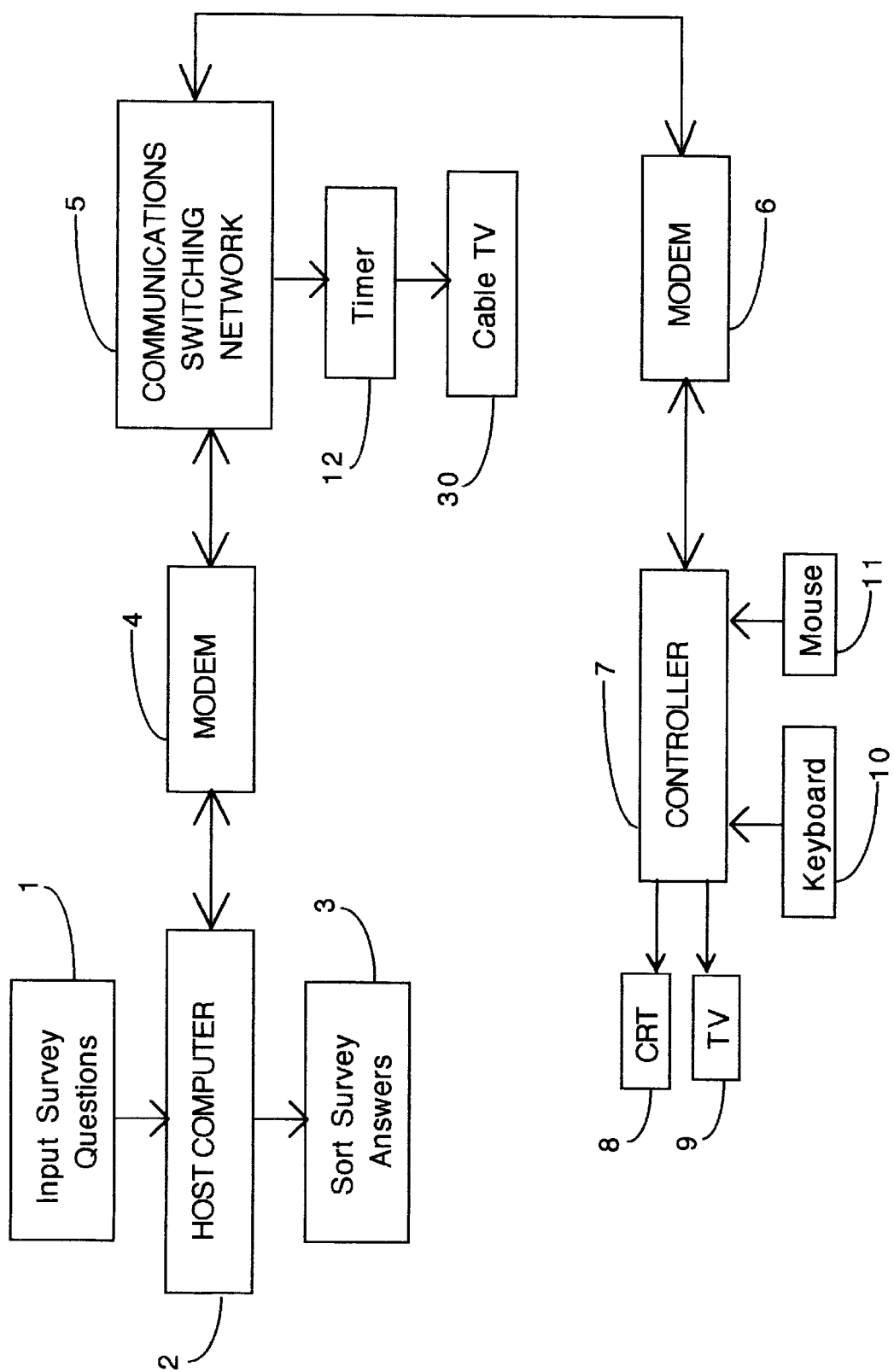
FIG. 3 is a block diagram for the accurate market survey collection method of the present invention when cable television access is sought by the responder.

FIG. 3 describes the invention with the same components described in FIG. 1, except that responder will receive access to cable TV 30 rather than the Internet 13.

Figure 4:
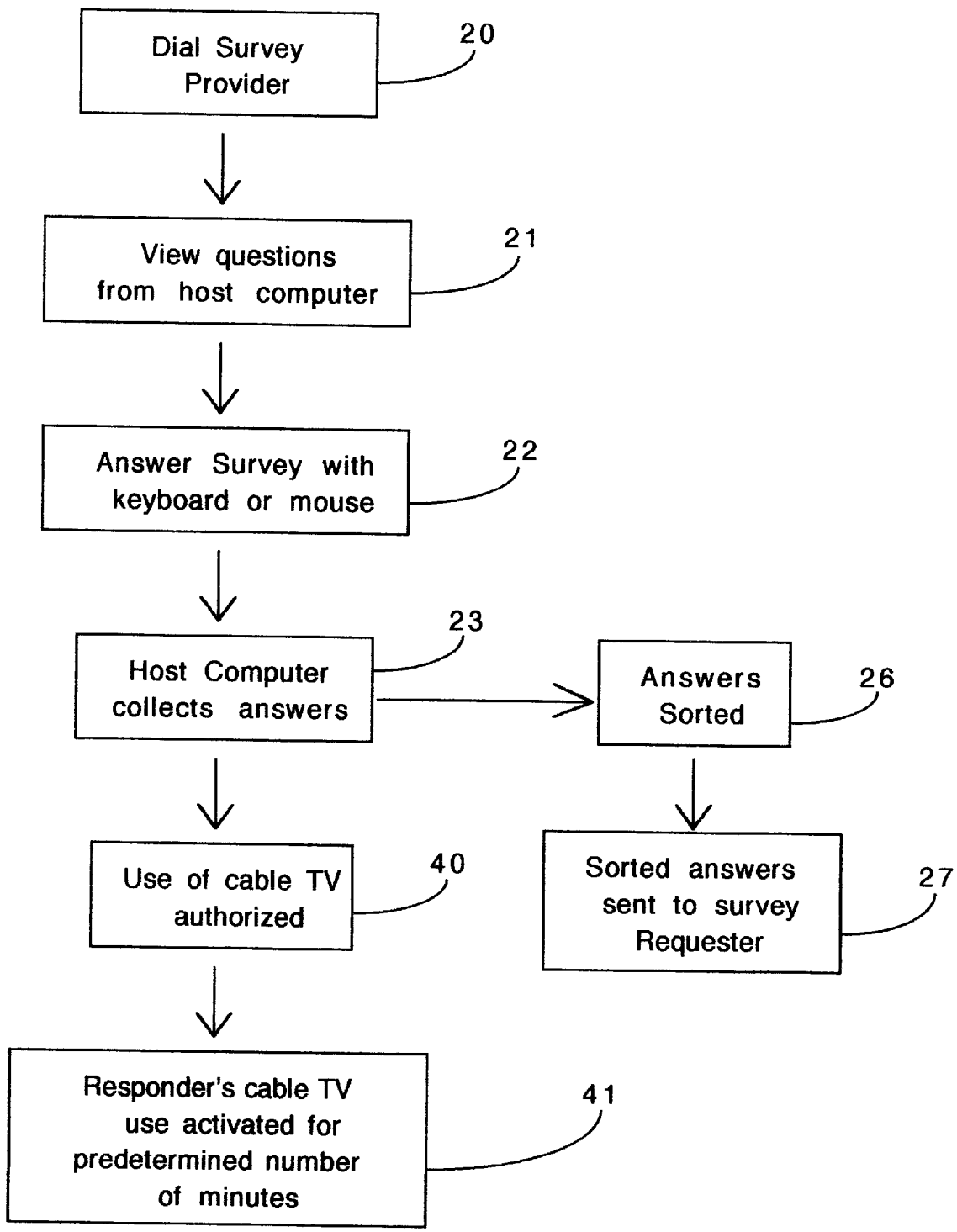
FIG. 4 is a flow diagram of the steps taken to practice the present invention when cable television access is sought by the responder.

FIG. 4 describes the steps a responder seeking cable TV access will take. The flow chart steps are similar to those in FIG. 2, except the host computer will authorize use of cable TV 40 for a predetermined number of minutes 41.

Questions which may be asked in the surveys include demographic data, such as the following:

1. Approximately how high is your income level? Select one:
    a. 10–15,000
    b. 15–25,000
    C. 25–35,000
    d. 35,000 or higher
2. At your present address, do you:
    a. own
    b. rent
    c. lease
3. For how long have you lived at your present address:
    a. 0–1 year
    b. 1–2 years
    C. 2 years or longer Questions which may be asked in a survey for a soft drink manufacturer include the following:

1. What type of soft drink do you drink:
    a. diet
    b. regular
    C. caffeine free
2. Where do you buy most of your soft drinks?
    a. food store
    b. vending machine
    C. gas station
    d. other_____
3. Does price have an influence on what you buy?
    a. yes
    b. no
4. Approximately how many soft drinks do you consume per week?
    a. 0–10
    b. 10–20
    c. 20 or more Questions which may be asked in a survey for a telecommunications company include the following:

1. Which rate do you prefer?
    a. flat rate (15 cents/minute)
    b. two rates (15 cents from 8 a.m.–6 p.m., 10 cents from 6 p.m.–8 a.m.)
    c. 10 cents/minute and no service charge 2. Who is your long distance carrier?
   a. AT&T
   b. MCI
   c. Sprint
   d. other_____
3. Do you want to use Internet telephony?
   a. yes
   b. no
4. Is the quality of sound or the price more important to you?
   a. Would you give up sound quality for price?
   b. Would you pay more for higher quality?
5. What percentage of your telephone Internet usage is for
   a. business:_____%
   b. personal:_____%

The respondent will be inherently interested in providing answers to the questions he is asked because he will be receiving free Internet access or free cable TV access in return for his cooperation in answering survey questions.

I claim:

1. A method for electronically accumulating market survey data from a plurality of responders comprising
   1) inputting demographic and market survey questions from market survey requester into a central data processor;
   2) connecting said central data processor to a communications switching network by means of a modem;
   3) connecting a controller to said communications switching network by means of a modem;
   4) connecting input means to said controller;
   5) connecting viewing means to said controller;
   6) having one of said responders contact said central data processor by way of said communications switching network;
   7) having said central data processor transmit demographic questions to said responder by way of said communications switching network;
   8) having said central data processor receive and process said responses to said controller;
   9) having said central data processor receive and process said responses to said demographic questions;
   10) having said central data processor transmit relavant market survey questions to said responder by way of said communications switching network;
   11) having said responder input responses to said market survey questions into said controller
   12) having said central data processor switch open a connection between Internet access and said controller;
   13) having said central data processor switch off said connection between said Internet access and said controller after a predetermined period of time,
   14) having said central data processor process and sort said responses to said market survey questions before transmission to said market survey requester.

2. A method for electronically accumulating market survey data from a plurality of responders comprising
   1) inputting demographic and market survey questions from a market survey requester into a central data processor;
   2) connecting said central data processor to a communications switching network by means of a modem;
   3) connecting a controller to said communications switching network by means of a modem;
   4) connecting input means to said controller;
   5) connecting viewing means to said controller;
   6) having one of said responders contact said central data processor by way of said communications switching network;
   7) having said central data processor transmit demographic questions to said responder by way of said communications switching network;
   8) having said responder input responses to said demographic questions into said controller;
   9) having said central data processor receive and process said responses to said demographic questions;
   10) having said central data processor transmit relevant market survey questions to said responder by way of said communications switching network;
   11) having said responder input responses to said market survey questions into said controller
   12) having said central data processor switch open a connection between a cable TV and said controller;
   13) having said central data processor switch off said connection between said cable TV and said controller after a predetermined period of time;
   14) having said central data processor process and sort responses to said market survey questions before transmission to said market survey requester.

* * * * *